3,032,406
HERBICIDAL METHOD EMPLOYING PHENOXYALKYLAMINES

John J. D'Amico, Charleston, and Anton G. Weiss, Nitro, W. Va., assignors to Monsanto Chemical Company, St. Louis, Mo., a corporation of Delaware
No Drawing. Filed May 1, 1959, Ser. No. 810,226
4 Claims. (Cl. 71—2.3)

The present invention relates to methods of destroying or controlling vegetation and to herbicidal compositions. More particularly it relates to methods of destroying or controlling vegetation by applying thereto a toxic concentration of a tertiary amine containing an arylether substituted alkyl radical.

The widespread use of chlorophenoxy acetic acids for chemical weed control has revealed serious deficiencies. There are weeds of economic importance which are resistant to the chlorophenoxy acetic acids. The removal of susceptible weeds increases the opportunity for resistant species to flourish. Accordingly, there has arisen a need for agents to control such hard to kill weeds as morning glory, field bindweed, Canadian thistle and devil's club. Furthermore, the chlorophenoxy acetic acids are unsafe to use on some crops because they injure or destroy the crop as well as the weeds. For example, cotton is fantastically sensitive to 2,4-D and cotton is a major crop. There is need for means to control weeds growing in cotton and corn. By the present invention it is now possible to take weed eradicant steps in growing cotton and corn without injuring the crop.

A general object of the invention is to destroy undesired vegetation. A particular object of the invention is to destroy weeds resistant to the chlorophenoxy acetic acids. A further general object is to provide improved compositions for agricultural use. A further particular object is to provide agricultural compositions which, in very low concentrations, destroy many broadleaf and some narrowleaf weeds without injuring desired grasses. A further particular object is to eradicate weeds growing in cotton and corn fields without injuring the crop. Other and further objects will either be apparent or pointed out in the detailed description of the invention which follows.

The active agents employed in the process of this invention may be represented by the general formula

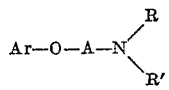

where Ar represents unsubstituted phenyl, or phenyl substituted by alkyl, A represents alkylene of 2-3 alkoxy or nitro carbon atoms and R and R' represent lower alkyl, lower alkoxy substituted lower alkyl, allyl or methallyl. Examples of Ar comprise tolyl, ethylphenyl, isopropylphenyl, xylyl, propylphenyl, butlphenyl, amylphenyl, nonyl and dodecylphenyl, methoxyphenyl, ethoxyphenyl, propoxyphenyl, isopropoxyphenyl and nitrophenyl. Examples of A comprise ethylene, methyl substituted ethylene and trimethylene. The substituents designated R and R' are illustrated by methyl, ethyl, propyl, isopropyl, methoxyethyl, ethoxyethyl, butyl and allyl.

In general, practice of this invention involves destroying or controlling vegetation through contact of the foliage with a lethal concentration of the toxicant. The herbicidal effect is severe and is accompanied occasionally by defoliation. By proper selection of the toxicant, broadleaf plants are controlled without significant injury to desired grasses. The action of these compounds is not to be confused with that of 2,4-dichlorophenoxy acetic acid which evokes a severe hormone-like crippling response which action is also observed with 2-(2,4-dichlorophenoxy)triethylamine. The visual response of the new toxicants is completely different. The hormone-like crippling action is absent. The phytotoxicity is usually accompanied and enhanced by chlorosis. In other words, the toxicants interfere with the chlorophyll mechanism in plants. On the other hand they are relatively innocuous to corn and cotton.

The toxicant may be applied conveniently in the form of a spray containing the active ingredient. The concentration will vary depending upon the particular vegetation for which control is sought. In general, concentrations within the range of 0.005% to 0.5% by weight of the total composition are adequate for most purposes although higher concentrations are, of course, very effective but seldom necessary.

The agricultural compositions may be in the form of solids or liquids. The free bases are essentially insoluble in water but soluble in common organic solvents, as for example heptane, chloroform, ethanol, ethyl acetate, acetone, ether and benzene. The acid addition and quaternary ammonium salts are more water soluble. They retain in large measure the toxic properties of the parent substances. Where the properties of phytotoxic organic acids can be tolerated these may constitute the acid element. The salts of 2,4-di-, 2,5-di- and 2,4,5-trichlorophenoxy acetic acid and of 2,2-dichloropropionic acid exert phytotoxicity characteristic of both the acid and base component.

Solid compositions may be prepared in the form of dusts or granules by mixing the active ingredient with a finely divided solid carrier such as talc, clay, pyrophyllite, silica and fuller's earth. Solid compositions may be applied directly to the plants or dispersed in water and applied as an aqueous dispersion. Instead of adsorbing on a solid carrier, the toxicants may be dispersed directly in water and such composition applied in spray form. Alternatively, an emulsifiable concentrate can be prepared by dissolving the toxicant in a suitable organic solvent and adding an emulsifying agent. As dispersing and wetting agents. there may be employed soft or hard sodium or potassium soaps, alkylated aromatic sodium sulfonates, such as sodium dodecylbenzenesulfonate, an amine salt, as for example dibutylammonium dodecylbenzenesulfonate, alkali metal salts of sulfated fatty alcohols, ethylene oxide condensation products of any of the following: alkyl phenols, tall oil and higher mercaptans. These are illustrations only of a large class of materials available and it will be appreciated that other dispersing and wetting agents may be substituted.

As illustrative of the herbicidal properties of the toxicants, a spray containing a concentration of 0.5% of the active ingredient shown in Table I was applied to the foliage of bean plants, to the foliage of a mixture of grasses and finally to the foliage of a mixture of broadleaved plants. The mixture is indicated in the table as "Broadleaf." A rating of 0 indicates no phytotoxicity, 1 slight, 2 moderate, 3 severe phytotoxicity and 4 plants dead.

Table I

| Toxicant | Phytotoxicity Rating | | |
| --- | --- | --- | --- |
| | Grass | Bean | Broadleaf |
| 2-(Phenoxy)-N,N-dimethylethylamine | 0 | 2 | 1 |
| 2-(Phenoxy)triethylamine | 0 | 2b | 2 |
| 2-(p.-Nitrophenoxy)triethylamine | 3 | 3b | 3 |
| 2-(p-Dodecylphenoxy)triethylamine | 2 | 3 | 2 |
| 2-(p-Nonylphenoxy)triethylamine | 4 | 3 | 4 | b = defoliation.

It was further noted that 2-(p-nitrophenoxy)triethylamine was an effective herbicide for broadleaf plants at concentrations down to 0.05% which corresponds to a rate of only one pound per acre. It also produced defoliation of bean plants at this low concentration.

The toxicants may be prepared by standard techniques of which the following is illustrative.

To a stirred solution comprising 47.1 grams (0.5 mole) of phenol and 160 grams (1.0 mole) of 25% sodium hydroxide in 100 ml. of water was added in one portion 86 grams (0.5 mole) of diethylaminoethyl chloride hydrochloride and the mixture heated at 90–100° C. for 6 hours. After cooling to 25° C., the reaction mixture was salted with sodium chloride and then extracted with 400 ml. of ethyl ether. The ether solution was washed with two 100 ml. portions of water, dried over sodium sulfate and the ether removed in vacuo at a maximum temperature of 80–90° C. at 1–2 mm. The 2-(phenoxy)-triethylamine so prepared was an amber oil obtained in 87.1% theory yield. Analysis gave 6.9% nitrogen as compared to 7.2% calculated for $C_{12}H_{19}NO$.

It is intended to cover all changes and modifications of the examples of the invention herein chosen for purposes of disclosure which do not constitute departures from the spirit and scope of the invention.

What is claimed is:

1. The method for destruction of undesired vegetation which comprises applying to foliage a phytotoxic concentration of a composition containing as the essential active ingredient 2-(p-nitrophenoxy)triethylamine.

2. The method for destruction of undesired vegetation which comprises applying to foliage a phytotoxic concentration of a composition containing as the essential active ingredient 2-(p-dodecylphenoxy)triethylamine.

3. The method for destruction of undesired vegetation which comprises applying to foliage a phytotoxic concentration of a composition containing as the essential active ingredient 2-(p-nonylphenoxy)triethylamine.

4. The method for destruction of undesired vegetation which comprises applying to the foliage thereof a phytotoxic concentration of a composition containing as an essential active ingredient a compound selected from the group consisting of 2-(p-nitrophenoxy)triethylamine, 2-(p-dodecylphenoxy)triethylamine and 2-(p-nonylphenoxy)triethylamine.

References Cited in the file of this patent

FOREIGN PATENTS 1,020,031    Germany _____ Nov. 28, 1957

OTHER REFERENCES

Jones et al., in "Biochemical Journal," vol. 45, 1949, pages 143 to 149.